Jan. 22, 1952     G. W. CURTIS     2,582,966
TRACTOR HAVING V BELT PULLEY CONTROL
Filed Sept. 23, 1947     3 Sheets-Sheet 1
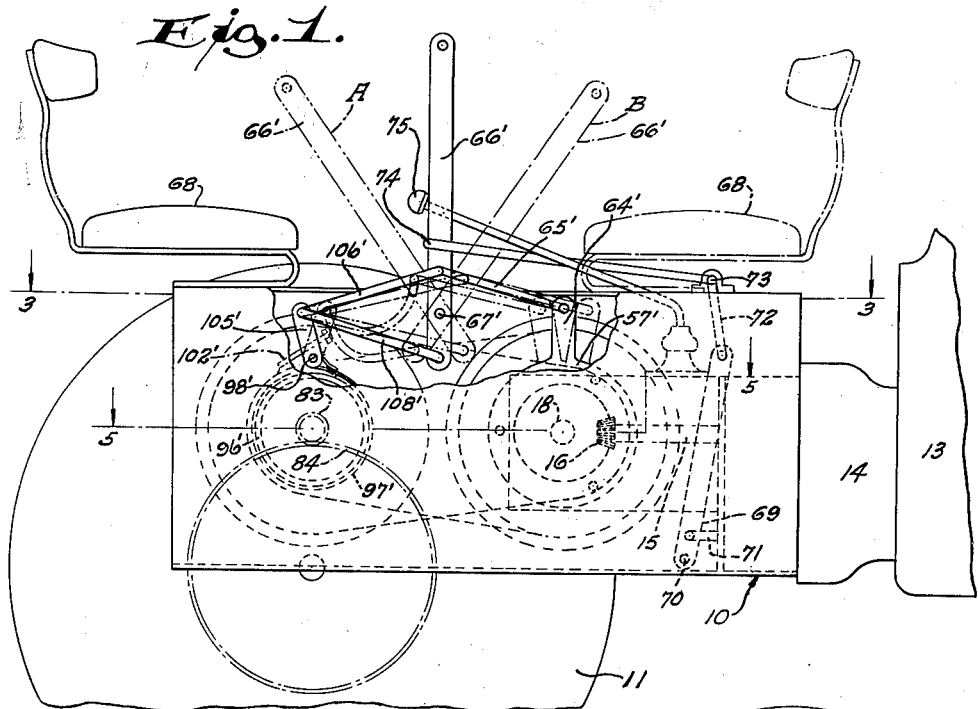
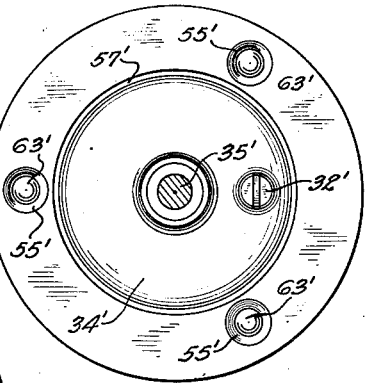
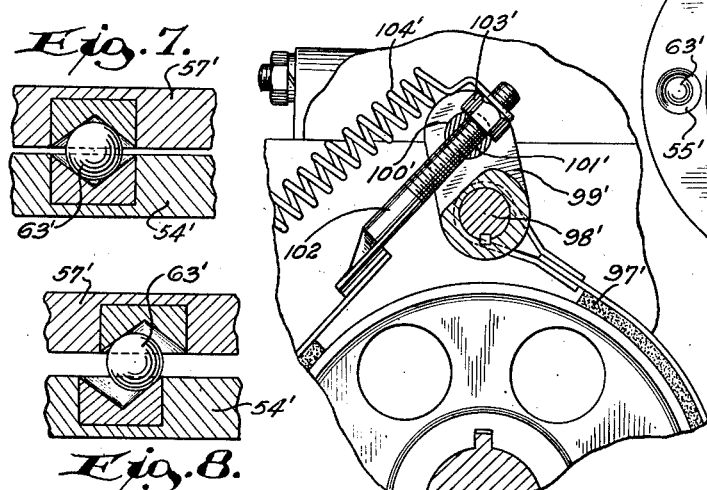
INVENTOR.
George W. Curtis
BY
Morsell & Morsell
ATTORNEYS.

Jan. 22, 1952     G. W. CURTIS     2,582,966
TRACTOR HAVING V BELT PULLEY CONTROL
Filed Sept. 23, 1947     3 Sheets-Sheet 2

INVENTOR.
George W. Curtis
BY
Morsell & Morsell
ATTORNEYS.

Jan. 22, 1952   G. W. CURTIS   2,582,966
TRACTOR HAVING V BELT PULLEY CONTROL
Filed Sept. 23, 1947   3 Sheets-Sheet 3

INVENTOR.
BY George W. Curtis
Morsell & Morsell
ATTORNEYS.

Patented Jan. 22, 1952

2,582,966

UNITED STATES PATENT OFFICE 2,582,966

TRACTOR HAVING V-BELT PULLEY CONTROL

George W. Curtis, Wauwatosa, Wis.

Application September 23, 1947, Serial No. 775,705

11 Claims. (Cl. 192—4)

This invention relates to improvements in tractors having V-belt pulley controls.

This invention relates in general to tractors such as those illustrated in my pending applications, Serial No. 610,538, filed August 13, 1945, now Patent No. 2,529,489, issued November 14, 1950, and Serial No. 691,272, filed August 17, 1946. In this type of construction the tractor has a multiple speed gear transmission which is equipped with a transverse output shaft. On each end of the shaft there is a variable speed driving pulley, and there are V-belts cooperating with said pulleys and leading to rear variable speed driven pulleys so that each side of the tractor may be independently driven at speeds controlled by the operator.

It is a general object of the present invention to provide a device of the class described which includes a fast acting control to provide for quick maneuvering of the vehicle.

A further object of the invention is to provide a tractor as above described, including brakes, wherein there is a novel structural cooperation between the brakes and the speed control so that the braking mechanism is operated automatically in conjunction with the speed control device for steering purposes or for slowing down or stopping the vehicle.

A further object of the invention is to provide a tractor as above described which may be operated efficiently and with ease in either direction, and which has a full range of speeds in both directions.

A more specific object of the invention is to provide a tractor which includes pulleys having movable sides for varying the driving speed, wherein there is novel mechanism including cams and balls for quickly transmitting movement to the movable face of a pulley with a minimum amount of effort on the part of the operator, the said mechanism being capable of effecting a quick change in the speed or direction of the movement of the vehicle.

Other objects of the invention are to provide a tractor of the class described which is strong and durable, which is inexpensive as compared with prior designs, which improves draw bar efficiency during steering, and which is otherwise well adapted for the purpose described.

In the accompanying drawings, illustrating one complete embodiment of the preferred form of the invention, in which the same reference numerals designate the same parts in all of the views:

Fig. 1 is a side elevational view of a tractor, parts being broken away, and the dot and dash lines indicating an alternate position for the driver's seat and different positions of movement of the control levers;

Fig. 2 is a fragmentary view on an enlarged scale with parts broken away and shown in vertical section to illustrate the brake band operating mechanism;

Fig. 6 is a sectional view taken on the line 6—6 of Fig. 5 showing the working face of one of the cam control rings;

Fig. 7 is a fragmentary sectional view taken on the line 7—7 of Fig. 5 showing one of the balls in a neutral position;

Fig. 8 is a similar view showing the positions of the camming recesses and ball when the control is operated a maximum distance in one direction; and Fig. 9 is a similar view showing the position of the parts when the control is operating a maximum distance in the opposite direction.

Figure 3:
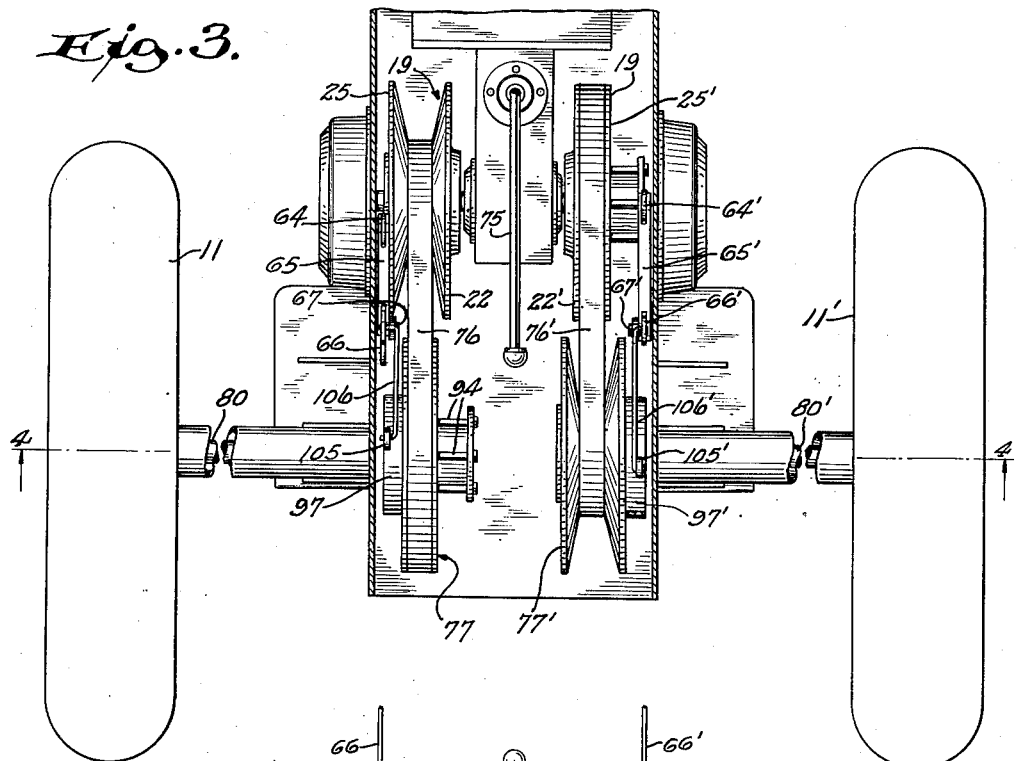
Fig. 3 is a sectional view taken approximately on the line 3—3 of Fig. 1.
Figure 4:
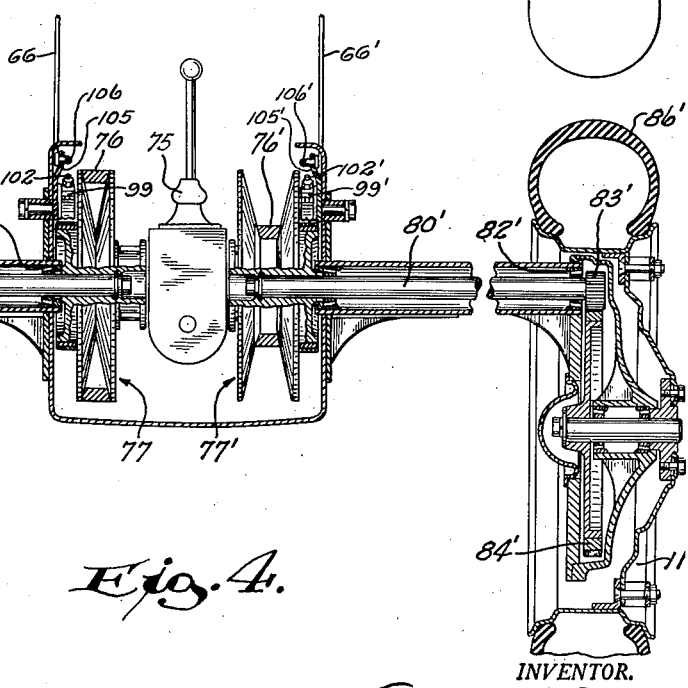
Fig. 4 is a vertical sectional view taken approximately on the line 4—4 of Fig. 3.

Referring more particularly to the drawings (Figs. 1 to 5), the numeral 10 designates a tractor having propelling wheels 11 and 11', an engine unit 13, and a tranmission 14, including a master clutch. Projecting from the transmission, which may be of any well known type capable of driving in two directions at a selected speed, is a drive shaft 15 having a bevel pinion 16 rigidly connected to its outer end.

Figure 5:
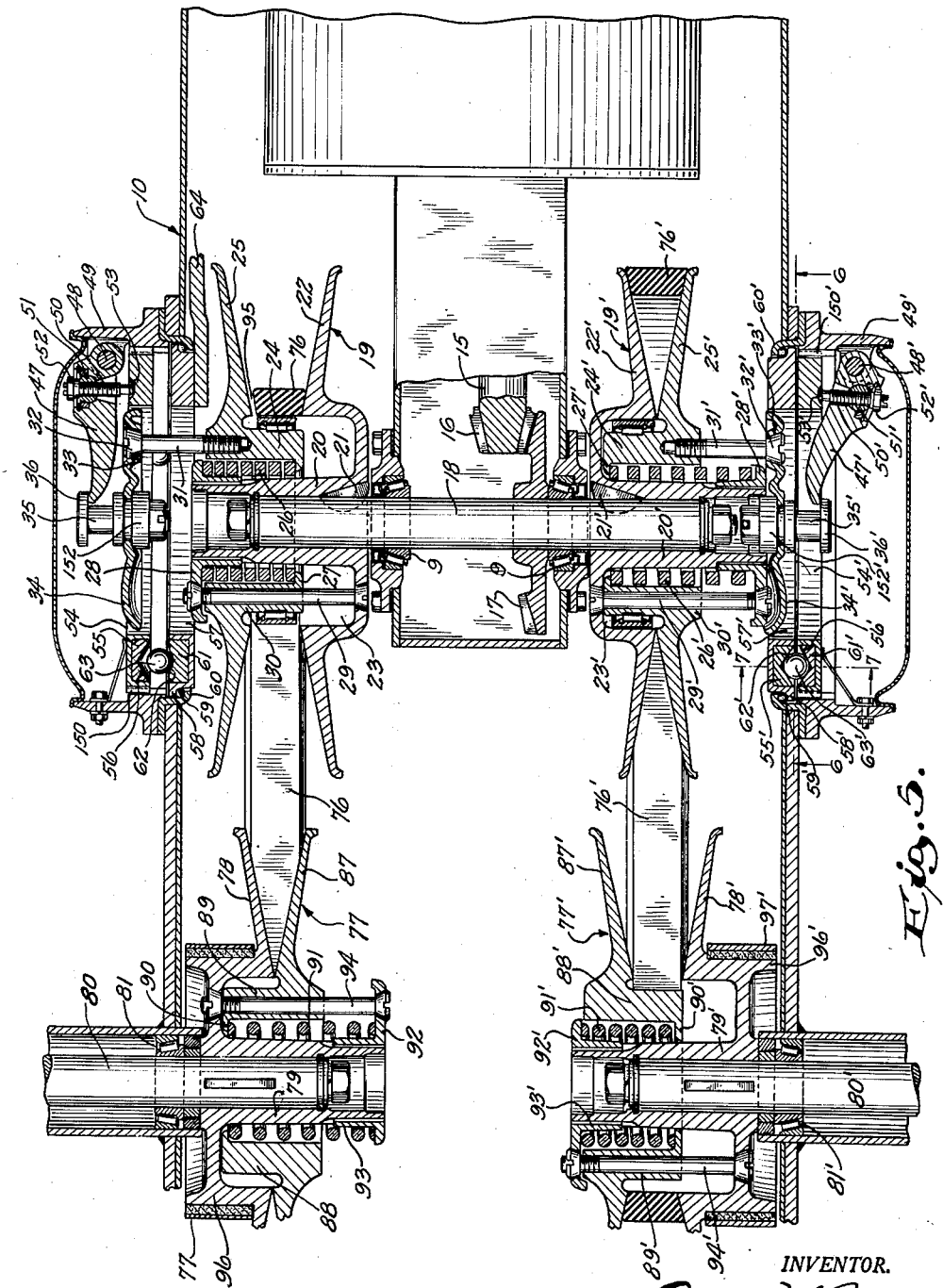
Fig. 5 is a sectional view taken approximately on the line 5—5 of Fig. 1.

Referring particularly to Fig. 5, the bevel pinion 16 drives a bevel gear 17 rigidly mounted on a transverse shaft 18. The latter is journaled in suitable bearings 19. On one end of the shaft 18 is mounted a V-belt pulley 19 and on the other end of said shaft is a V-belt pulley 19', which is identical in construction to the V-belt pulley 19 except that it faces in the opposite direction. Inasmuch as the pulley units 19 and 19' and associated parts are identical on the two sides of the tractor, only one will be described, and the same numerals primed are applied to the corresponding parts on the other side.

Describing the pulley unit 19, there is a hub portion 20 which is keyed as at 21 to the shaft 18. The hub has an integral flanged portion 22 which forms the fixed side of the pulley. Surrounding the hub portion 20 and inwardly of the part 22 is an annular recess or pocket 23 of a size to accommodate the hub portion 24 which carries the movable side 25 of the pulley. The hub portion 24 is axially slidable from the spread position illustrated in Fig. 5 to an opposite position corresponding to the position shown by the parts 24' and 25' on the other side of the tractor in Fig. 5. Such movement is aided by the action of a relatively strong coil spring 26, which surrounds the hub portion 20 and which is positioned within the hub portion 24 of the movable side 25, there being an inwardly directed annular flange 27 forming a seat for one end of the coil spring. The seat for the other end of the spring is formed by a flanged member 28 which is splined on the hub portion 20 and which is rigidly connected by a series of bolts 29 with the hub portion 20 of the fixed pulley side 22, said bolts 29 extending slidably through bores 30 in the hub portion 24 of the movable pulley side 25, so that hub 24 is guided on the bolts 29 during axial movement.

A series of bolts 31 have inner ends screwed into the hub portion 24 and have conical heads 32, which are seated in recesses 33 of like shape in a disk 34. The disk 34 therefore is rotatable with the pulley 19.

Coaxial with the shaft 18 and connected to and projecting from the center of the disk 34 is a stud 35 having on its inner end a thrust bearing 152 adapted to exert pressure on disk 34 and also having a flanged outer end 36, which is engaged by the inner end of a lever 47. The latter lever is pivoted as at 48 within a covered housing 49. An adjustment bolt 50 is threaded into a ball 51. The ball and bolt are mounted for rocking movement in the lever 47, and the bolt may be locked in a position of adjustment by a nut 52. The inner end of the bolt coacts with a recess 53 in a cam ring 54. Due to a splined connection 150 between the periphery of the ring 54 and the interior of the housing 49 the ring cannot rotate relative to said housing.

On the inner face of the ring 54 are equally spaced inserts 55 of hard metal. In the preferred embodiment of the invention, there are three of such inserts which have recesses 56, the latter being conical in shape and having sides which are adapted to form cam surfaces (Figs. 6 to 9 inclusive).

Another ring 57 positioned inwardly of the ring 55 has an outwardly projecting annular flange 58 which is rotatable on bearings 59 seated within an annular race 60. The ring 57 has inserts 61 which are identical with the inserts 55 and which have identical conical recesses 62. Within each pair of cooperating conical recesses is a ball 63. The ring 57 has an arm 64 projecting therefrom which may be manually moved to cause rotation of the ring 61. When the arm 64 is moved in one direction, the balls 63 will roll between the conical surfaces 56 and 62 from the position of Fig. 7 to the position of Fig. 8 to separate the rings 54 and 57, and acting through the bolt 50, to move the lever 47. This in turn acts through the flange 36 of the stud 35, through the bearing 152, through the disk 34, and through the bolts 31 to move the movable side 25 of the pulley to the spread position shown in Fig. 5, the spring 26 being compressed. If the arm 64 is moved in the reverse direction, the parts assume the position of Fig. 9 to also separate the rings 54 and 57 and cause the same movement of the movable side of the pulley 25.

The arms 64 and 64' (on the other side) are connected by pivoted links 65 and 65' (see Figs. 1 and 3) with handles 66 and 66', the latter being pivoted to the tractor frame as at 67 and 67'. It is thus apparent that when the operator's seat 68 is in the full line position of Fig. 1 that the handles 66 and 66' may be pulled to the dot and dash line position A to effect separation of the cam rings 54, 57, and 54', 57'. When the seat 68 is in the dot and dash line position of Fig. 1, the handles 66 and 66' may be pulled to the position B to affect the same separation of the rings 54, 57, and 54', 57'.

The frame of the tractor may be provided with any suitable means providing for changing the position of the operator's seat from the full line position of Fig. 1 to the dot and dash position therein.

The clutch within the clutch unit 14 may be controlled by a lever 69 pivoted as at 70 and acting to move a reciprocable rod 71. The upper end of the lever may in turn be connected to the lower end of a lever 72. The upper end of the lever 72 may be rigidly connected to a suitably journaled rock shaft 73. The latter may in turn be operated by a handle 74 which is so positioned that it is convenient in either position of the seat 68. Likewise the conventional gear shift lever 75 which controls the usual change speed transmission is so located as to be convenient in either position of the seat 68.

The V-belts and V-pulleys are constructed the same on the two sides of the vehicle and therefore only one side will be described, the corresponding parts on the other side being designated by the same numerals primed. Coacting with the pulley 19 is a V-belt 76 which extends around a driven pulley 77. Pulley 77 has a fixed side 78 provided with a hub portion 79 which is keyed to shaft 80. Shaft 80 is journaled in suitable bearings 81 and 82 and has its outer end formed with a rigidly mounted pinion 83 (see Fig. 4). Pinion 83 is in mesh with a gear 84 which is rigidly connected to the wheel 11 to cause driving of the latter. The wheel may be equipped with pneumatic tires 86. In the preferred embodiment of the invention a rubber tired tractor type wheel is utilized. However, the invention is equally applicable to tractors which are equipped with endless track propelling devices.

The pulley 77 has a movable side 87 having a hub 88 formed with a series of axial bores 89. The hub also has an inwardly directed flange 90 forming a seat for one end of a coil spring 91. The other end of the coil spring is seated on an annular flange 92 of a flanged member 93, the latter being splined on the hub portion 79. Bolts 94 extending slidably through the bores 89 lock the flanged member 93 to the fixed pulley side 78 while serving as a guide for the axial movement of the movable pulley side.

Inasmuch as the springs 26 and 26' in connection with the driving pulleys 19 and 19' are considerably stronger than the springs 91 and 91' in connection with the driven pulleys 77 and 77', it is apparent that when no manual force is being exerted, the springs 26 and 26' will always tend to move the movable sides of the pulleys 19 and 19' to the position of the side 25' on Fig. 5. This will, therefore, force the V-belt in an outward direction radially on its respective pulley 25 or 25', as shown by the V-belt 76', to an outermost position in the groove of the pulley 19'. This in turn will cause the portion of the V-belt 76' which passes around the pulley 77' to exert a spreading effect upon the latter pulley against the tension of the spring 91'.

On the other hand if a manual force is exerted to spread a driving pulley such as is illustrated in Fig. 5 with the pulley 19, then the tension of the spring 26 is overcome and the belt 76 encircles the innermost portion of the groove of the pulley 19. This in turn allows the spring 91 to move the movable side 87 of the driven pulley 77 to the positions shown in Fig. 5 wherein the V-belt encircles the largest diameter portion of the groove of the pulley 77. When the belt is in this last described position, the arrangement is such that the movable side 25 of the pulley 19 is spaced as at 95 out of contact with the side of the belt 76. Thus there is no frictional driving contact with the belt, and the wheel 11 on this side of the tractor will not be driven when the pulleys 19 and 77 are in the position shown in Fig. 5. It is thus apparent that the lever 64 on one side of the vehicle will control the speed of the wheel 11 between minimum and maximum limits. It is also apparent that the lever 64' on the other side of the vehicle will control the speed of the other wheel 11' independently of the control for the first mentioned side.

Referring now to the braking mechanism, there is a brake on each side of the vehicle. Only the side shown in Figs. 1 and 2 will be described, the corresponding parts on the other side being indicated by the same numerals unprimed. Referring principally to Fig. 5 the fixed side 78' of the pulley 77' has an integral brake drum 96' engageable by a brake band 97'. Referring now to Fig. 2, one end of the brake band is connected to a rock shaft 98'. Rigidly connected at its lower end to the rock shaft 98' are spaced toggle links 99'. Extending transversely between the toggle links 99' is a pin 100' having a transverse hole 101' through which a bolt 102' extends from the other end of the brake band. A nut 103' threaded on the bolt 102' holds the parts in assembled position, and there is a spring 104' normally maintaining the band in released position.

Referring now to Fig. 1, rigidly connected at its lower end to the rock shaft 98' is a lever 105'. A flexible connecting member 106' connects the upper end of the lever 105' with a portion of the handle 65' which is above the pivot 67'. Another flexible connecting member 108' connects the upper end of the lever 105' with the lower end of the handle 66' below its pivot 67'. When the lever 66' is vertical both of the flexible connections 106' and 108' allow the brake 97' to be in a released position.

*Operation*

In use of the tractor, when the handles 66 and 66' are in the vertical full line position of Fig. 1, then the brake bands 97 and 97' will be maintained in a non-braking condition. Assuming now that the operator is seated on the seat 68 with the seat in the full line position of Fig. 1, then with the engine 13 in operation, and with the clutch handle 74 and change speed transmission lever 75 in running position, the tractor will move along in a normal manner. When the lever 66' is pulled toward the dot and dash line position A of Fig. 1, then the flexible cable 108' will pull on the brake lever 105' to move the brake band 97' toward braking position. At the same time the conical recesses 56' and 62' will have been moved from the position of Fig. 7 toward the position of Fig. 9 to cause the balls 63' to spread the rings 54' and 57'. This causes a pushing movement on the bolt 50' in the lever 47' forcing the latter outwardly and causing a pull to be exerted on the stud 35'. The latter acts through the disk 34' and bolts 31' to pull the movable side 25' of the pulley 19' from the position of Fig. 5 toward a spread position against the tension of the coil spring 26'. This permits the V-belt 76' to slip inwardly into the groove of the pulley 19' and allows the spring 91' of the driven pulley 77' to move the movable side 87' of said pulley toward the fixed side. This forces the belt to move outwardly in the groove of the pulley 77', thereby reducing the speed of the wheel on this side of the vehicle and increasing the torque.

As the movement of the lever 66' is continued toward the position A of Fig. 1, eventually the movable side 25' of the pulley 19' will be moved out of frictional engagement with the belt 76' to completely stop transmission of power to the wheel 11' on this side of the vehicle (there being a space corresponding to the space 95 which is shown in connection with the pulley 19 in Fig. 5). At the same time the brake band 97' will be engaged with its drum 96' absorbing any remaining momentum and bringing wheel 11' to rest. This will cause a quick steering of the tractor around the "dead" wheel 11' as long as belt 76 continues to drive wheel 11. To steer in the opposite direction, the lever 66 on the other side is pulled to the position A of Fig. 1. To reduce the speed of the vehicle and gain increased power while driving in a straight line, both of the handles 66 and 66' are pulled simultaneously a desired amount toward the position A. Obviously any speed between that afforded by the mechanism when the handles are in the full line position of Fig. 1 and that afforded by the mechanism when the handles are in the stopping position indicated at A in Fig. 1 may be obtained.

When the tractor is to be used in a reversed position, which is desirable in many types of work, then the seat 68 is moved from the full line position of Fig. 1 to the dot and dash line position. The operator then may operate the tractor just as heretofore described except that the handles 66 and 66' are pulled toward the position B instead of toward the position A to slow up the vehicle. Obviously when the handles are pulled all the way over to the position B, no power will be transmitted to the driving pulleys 77 and 77' and the brakes will be set.

Due to the use of the calibrated springs 26—26' and 91—91' the ball elements 63 and 63' and to the use of the conical recesses in the rings 54 and 54' and 57 and 57', a change may be affected between maximum and minimum speeds with little physical effort and in a short interval of time. The arrangement provides great flexibility in maneuvering the vehicle, and makes it possible to perform quick steering even though endless tracks are employed rather than wheels. In addition, with the present construction, the tractor will continue to exert full draw bar forces in the majority of conditions when going around corners, thereby increasing efficiency. The arrangement has been so worked out that the same maneuverability is made possible in either direction of use of the tractor.

Various changes and modifications may be made without departing from the spirit of the invention, and all of such changes are contemplated as may come within the scope of the claims.

What is claimed as the invention is:

1. In a vehicle having an engine, having a propelling member mounted on a first transverse shaft, having a brake for said propelling member and having a second transverse shaft driven by said engine; a variable width V-belt pulley on said first shaft; a variable width V-belt pulley on said second shaft; an endless V-belt connecting said pulleys, said pulleys and belt constituting a variable speed transmission for driving said propelling member; cam mechanism for adjusting the width of the pulley on said second shaft, said mechanism including a slidably and non-rotatably supported control member and including a rotatably supported control member, and including means between said control members responsive to rotative movement of the rotatable control member in either direction from its normal position to cause axial movement of the non-rotatable member and widening of the pulley on said second shaft; a pivotally mounted hand lever normally in neutral position; means connected to said hand lever and to said brake for causing said brake to be set upon predetermined movement of said lever in either direction from its neutral position; and a link connected between said lever and said rotatable control member, whereby the speed of the propelling member can be selectively varied or said member stopped by selectively moving said lever in either direction from its normal position.

2. In a vehicle having an engine, having a propelling member mounted on a first transverse shaft, having a brake for said propelling member, and having a second transverse shaft driven by said engine, a variable width V-belt pulley on said first shaft; a variable width V-belt pulley on said second shaft; an endless V-belt connecting said pulleys, said pulleys and belt constituting a variable speed transmission for driving said propelling member; cam mechanism for adjusting the width of the pulley on said second shaft, said mechanism including a slidably and non-rotatably supported control member and including a rotatably supported control member, and including means between said control members responsive to rotative movement of the rotatable control member in either direction from its normal position to cause axial movement of the non-rotatable control member and widening of the pulley on said second shaft; a hand lever pivotally mounted intermediate its length and normally in neutral position; flexible means connected to said hand lever above and below its pivotal mounting and extending to said brake for causing said brake to be set upon predetermined movement of said lever in either direction from its neutral position; and a link connected between said lever and said rotatable control member, whereby the speed of the propelling member can be selectively varied or said member stopped by selectively moving said lever in either direction from its normal position.

3. In a vehicle having an engine, having a propelling member mounted on a first transverse shaft, having a brake for said propelling member, and having a second transverse shaft driven by said engine, a variable width V-belt pulley on said first shaft; a variable width V-belt pulley on said second shaft; an endless V-belt connecting said pulleys, said pulleys and belt constituting a variable speed transmission for driving said propelling member; cam mechanism for adjusting the width of the pulley on said second shaft, said mechanism including a slidably and non-rotatably supported control member coaxial with said second shaft and including a rotatably supported control member coaxial with said shaft, and including roller means between said control members responsive to rotative movement of the rotatable control member in either direction from its normal position to cause axial movement of the non-rotatable member and widening of the pulley on said second shaft; a pivotally mounted hand lever normally in neutral position; means connected to said hand lever and to said brake for causing said brake to be set upon predetermined movement of said lever in either direction from its neutral position; and a link connected between said lever and said rotatable control member, whereby the speed of the propelling member can be selectively varied or said member stopped by selectively moving said lever in either direction from its normal position.

4. In a vehicle having an engine having a propelling member mounted on a first transverse shaft, having a brake for said propelling member, and having a second transverse shaft driven by said engine, a variable width V-belt pulley on said first shaft; a variable width V-belt pulley on said second shaft; an endless V-belt connecting said pulleys, said pulleys and belt constituting a variable speed transmission for driving said propelling member; cam mechanism for adjusting the width of the pulley on said second shaft, said mechanism including a slidably and non-rotatably supported control member formed with cam recesses and including a rotatably supported control member formed with cam recesses, said control members being normally positioned with the recesses of one control member opposite to and facing the recesses of the other control member; a rollable member in each pair of said recesses and responsive to rotative movement of the rotatable control member in either direction from its normal position to cause axial movement of the non-rotatable member and widening of the pulley on said second shaft; a pivotally mounted hand lever normally in neutral position; means connected to said hand lever and to said brake for causing said brake to be set upon predetermined movement of said lever in either direction from its normal position; and a link connected between said lever and said rotatable control member, whereby the speed of the propelling member can be selectively varied or said member stopped by selectively moving said lever in either direction from its normal position.

5. In a vehicle having an engine, having a propelling member mounted on a first transverse shaft, having a brake for said propelling member, and having a second transverse shaft driven by said engine, a variable width V-belt pulley on said first shaft; a variable width V-belt pulley on said second shaft; an endless V-belt connecting said pulleys, said pulleys and belt constituting a variable speed transmission for driving said propelling member; cam mechanism for adjusting the width of the pulley on said second shaft, said mechanism including a slidably and non-rotatably supported control member formed with cam recesses and including a rotatably supported control member formed with cam recesses; said control members being normally positioned with the recesses of one control member opposite to and facing the recesses of the other control member; a rollable member in each pair of said recesses and responsive to rotative movement of the rotatable control member in either direction from its normal position to cause axial movement of the non-rotatable member and widening of the pulley on said second shaft; a hand lever pivotally mounted intermediate its length and normally in neutral position; flexible means connected to said hand lever above and below its pivotal mounting and extending to said brake for causing said brake to be set upon predetermined movement of said lever in either direction from its normal position; and a link connected between said lever and said rotatable control member, whereby the speed of the propelling member can be selectively varied or said member stopped by selectively moving said lever in either direction from its normal position.

6. In a vehicle having an engine and having a propelling member and having a brake for said propelling member; a first pulley driven by said engine and formed with a peripheral V-groove, said pulley having a side portion movable axially to vary the width of said groove; a pair of coaxial relatively rotatable cam members for moving the said portion of said pulley axially upon relative rotation in either direction; a second pulley for driving said propelling member, said second pulley having a peripheral V-groove and having a movable side; means normally urging the movable side portion of said second pulley in a groove narrowing direction; an endless V-belt connecting said first and second pulleys to provide a variable speed transmission, said V-belt having opposite side surfaces for engagement with the sides of the V-grooves of said pulleys; a hand lever pivotally mounted intermediate its length and normally in neutral position; and means connecting said cam mechanism and said brake to said lever whereby movement of said lever a predetermined distance in either direction away from its neutral position causes movement of the movable side portion of said first pulley in a groove widening direction out of engagement with said V-belt to stop transmission of power to the propelling member, said lever movement causing setting of the brake simultaneously with said disengagement.

7. In a vehicle having an engine, having a propelling member mounted on a first transverse shaft, having a brake for said propelling member and having a second transverse shaft driven by said engine; a variable width V-belt pulley on said first shaft; a variable width V-belt pulley on said second shaft; an endless V-belt connecting said pulleys, said pulleys and belt constituting a variable speed transmission for driving said propelling member; cam mechanism for adjusting the width of the pulley on said second shaft, said mechanism including a slidably and non-rotatably supported control member and including a rotatably supported control member, and including means between said control members responsive to rotative movement of the rotatable control member in either direction from its normal position to cause axial movement of the non-rotatable member; lever means connecting the non-rotatable control member with the pulley on said second shaft to cause widening of said pulley upon axial movement of said control member; a pivotally mounted hand lever normally in neutral position; means connected to said hand lever and to said brake for causing said brake to be set upon predetermined movement of said lever in either direction from its neutral position; and a link connected between said lever and said rotatable control member, whereby the speed of the propelling member can be selectively varied or said member stopped by selectively moving said lever in either direction from its normal position.

8. In a vehicle having an engine, having a propelling member mounted on a first transverse shaft and having a second transverse shaft driven by said engine; a variable width V-belt pulley on said first shaft; a variable width V-belt pulley on said second shaft; an endless V-belt connecting said pulleys, said pulleys and belt constituting a variable speed transmission for driving said propelling member; cam mechanism for adjusting the width of the pulley on said second shaft, said mechanism including a slidably and non-rotatably supported control member and including a rotatably supported control member coaxial with said second shaft, and including means between said control members responsive to rotative movement of the rotatable control member in either direction from its normal position to cause axial movement of the non-rotatable member and widening of the pulley on said second shaft; a pivotally mounted hand lever normally in neutral position; and a link connected between said lever and said rotatable control member, whereby the speed of the propelling member can be selectively varied between zero and a predetermined maximum by selectively moving said lever in either direction from its normal position.

9. In a vehicle having an engine having a propelling member mounted on a first transverse shaft, having a brake for said propelling member, and having a second transverse shaft driven by said engine, a variable width V-belt pulley on said first shaft; a variable width V-belt pulley on said second shaft; an endless V-belt connecting said pulleys, said pulleys and belt constituting a variable speed transmission for driving said propelling member; cam mechanism for adjusting the width of the pulley on said second shaft, said mechanism including a slidably and non-rotatably supported control member formed with cam recesses and including a rotatably supported control member formed with cam recesses, said control members being normally positioned with the recesses of one control member opposite to and facing the recesses of the other control member; a rollable member in each pair of said recesses and responsive to rotative movement of the rotatable control member from its normal position to cause axial movement of the non-rotatable member and widening of the pulley on said second shaft; a pivotally mounted hand lever normally in neutral position; means connected to said hand lever and to said brake for causing said brake to be set upon predetermined movement of said lever from its normal position; and a link connected between said lever and said rotatable control member, whereby the speed of the propelling member can be selectively varied or said member stopped by selectively moving said lever from its normal position.

10. In a vehicle having an engine, having a propelling member mounted on a first transverse shaft, having a brake for said propelling member and having a second transverse shaft driven by said engine; a variable width V-belt pulley on said first shaft; a variable width V-belt pulley on said second shaft; an endless V-belt connecting said pulleys, said pulleys and belt constituting a variable speed transmission for driving said propelling member; cam mechanism for adjusting the width of the pulley on said second shaft, said mechanism including a slidably and non-rotatably supported control member and including a rotatably supported control member, and including means between said control members responsive to rotative movement of the rotatable control member from its normal position to cause axial movement of the non-rotatable member; lever means connecting the non-rotatable control member with the pulley on said second shaft to cause widening of said pulley upon axial movement of said control member; a pivotally mounted hand lever normally in neutral position; means connected to said hand lever and to said brake for causing said brake to be set upon predetermined movement of said lever from its neutral position; and a link connected between said lever and said rotatable control member, whereby the speed of the propelling member can be selectively varied or said member stopped by selectively moving said lever from its normal position.

11. In a vehicle having an engine, having a propelling member mounted on a first transverse shaft and having a second transverse shaft driven by said engine; a variable width V-belt pulley on said first shaft; a variable width V-belt pulley on said second shaft; an endless V-belt connecting said pulleys, said pulleys and belt constituting a variable speed transmission for driving said propelling member; cam mechanism for adjusting the width of the pulley on said second shaft, said mechanism including a slidably and non-rotatably supported control member and including a rotatably supported control member coaxial with said second shaft, and including means between said control members responsive to rotative movement of the rotatable control member from its normal position to cause axial movement of the non-rotatable member and widening of the pulley on said second shaft; a pivotally mounted hand lever normally in neutral position; and a link connected between said lever and said rotatable control member, whereby the speed of the propelling member can be selectively varied between zero and a predetermined maximum by movement of said lever from its normal position.

GEORGE W. CURTIS.

REFERENCES CITED

The following references are of record in the file of this patent:

UNITED STATES PATENTS

| Number | Name | Date |
|---|---|---|
| 939,427 | Main | Nov. 9, 1909 |
| 1,012,912 | Prather | Dec. 26, 1911 |
| 1,246,359 | Trigwell | Nov. 13, 1917 |
| 1,272,287 | Martell | July 9, 1918 |
| 1,279,547 | Hueber | Sept. 24, 1918 |
| 1,292,972 | Thompson | Jan. 28, 1919 |
| 1,371,330 | Springer | Mar. 15, 1921 |
| 1,663,596 | Haumann | Mar. 27, 1928 |
| 2,165,431 | Wellman | July 11, 1939 |
| 2,175,830 | Davis | Oct. 10, 1939 |
| 2,185,435 | Goepfrich | Jan. 2, 1940 |
| 2,276,186 | Getchell | Mar. 10, 1942 |
| 2,392,729 | Edge | Jan. 8, 1946 |
| 2,467,249 | Bobard | Apr. 12, 1949 |

FOREIGN PATENTS

| Number | Country | Date |
|---|---|---|
| 5,447 | Great Britain | 1914 |
| 23,292 | Great Britain | 1911 |
| 465,303 | Great Britain | May 5, 1937 |
| 551,872 | France | Jan. 15, 1923 |